United States Patent
Alekseev

(10) Patent No.: US 12,437,902 B2
(45) Date of Patent: Oct. 7, 2025

(54) METHOD AND DEVICE FOR COOLING OF A SUPERCONDUCTING CABLE AND CORRESPONDING SYSTEM

(71) Applicant: Linde GmbH, Pullach (DE)

(72) Inventor: Alexander Alekseev, Wolfratshausen (DE)

(73) Assignee: Linde GmbH, Pullach (DE)

( * ) Notice: Subject to any disclaimer, the term of this patent is extended or adjusted under 35 U.S.C. 154(b) by 1114 days.

(21) Appl. No.: 17/443,063

(22) Filed: Jul. 20, 2021

(65) Prior Publication Data
US 2022/0028583 A1    Jan. 27, 2022

(30) Foreign Application Priority Data
Jul. 23, 2020 (EP) ..................... 20020335

(51) Int. Cl.
| | |
|---|---|
| H01B 12/16 | (2006.01) |
| C09K 5/04 | (2006.01) |
| H01B 7/42 | (2006.01) |
| H02G 15/34 | (2006.01) |

(52) U.S. Cl.
CPC ............ *H01B 12/16* (2013.01); *C09K 5/041* (2013.01); *H01B 7/423* (2013.01); *H02G 15/34* (2013.01); *C09K 2205/132* (2013.01)

(58) Field of Classification Search
CPC ......... H01B 12/16; H02G 15/34; C09K 5/041
See application file for complete search history.

(56) References Cited

U.S. PATENT DOCUMENTS 3,646,243 A * 2/1972 Graneau ................ H02G 15/34
62/51.1
6,523,366 B1 2/2003 Bonaquist et al.
(Continued)

FOREIGN PATENT DOCUMENTS

DE 19755484 A1 6/1999
DE 102012016292 A1 2/2014
(Continued)

OTHER PUBLICATIONS

H.-M. Chang et al., "Thermodynamic design of 10 kW Brayton cryocooler for HTS cable", AIP Conference Proceedings 1434, 1664 (2012).

*Primary Examiner* — Paul A Wartalowicz
(74) *Attorney, Agent, or Firm* — Millen, White, Zelano & Branigan, P.C; Brion P. Heaney

(57) ABSTRACT

The invention relates to a method for cooling a superconducting cable (1) using a coolant containing or consisting of liquid nitrogen, wherein at least a part of the coolant is subjected to a subcooling step and thereafter brought into thermal contact with the superconducting cable (1) in a cooling cycle, wherein said subcooling step is at least in part performed using a refrigerant provided in a Brayton process in which at least a part of the refrigerant is cooled and heated in a main heat exchanger (11). According to the present invention, a part of the coolant is withdrawn from the cooling cycle and heated in the same main heat exchanger (11) in which at least a part of the refrigerant is cooled and heated in the Brayton process. A corresponding device and a corresponding system are also part of the present invention.

20 Claims, 8 Drawing Sheets

(56) References Cited

U.S. PATENT DOCUMENTS

| | | | | |
|---|---|---|---|---|
| 2006/0150639 A1* | 7/2006 | Zia | ......................... | H02G 15/34 |
| | | | | 62/50.1 |
| 2007/0107443 A1* | 5/2007 | Royal | .................... | H02G 15/34 |
| | | | | 62/48.2 |
| 2013/0333912 A1* | 12/2013 | Yamamoto | ............. | H01B 12/16 |
| | | | | 174/15.5 |
| 2014/0378312 A1* | 12/2014 | Tamada | ................. | H01B 12/16 |
| | | | | 174/15.5 |

FOREIGN PATENT DOCUMENTS

| | | |
|---|---|---|
| DE | 102013011212 A1 | 1/2015 |
| EP | 1355114 A3 | 3/2005 |
| EP | 3511650 A1 | 7/2019 |

* cited by examiner

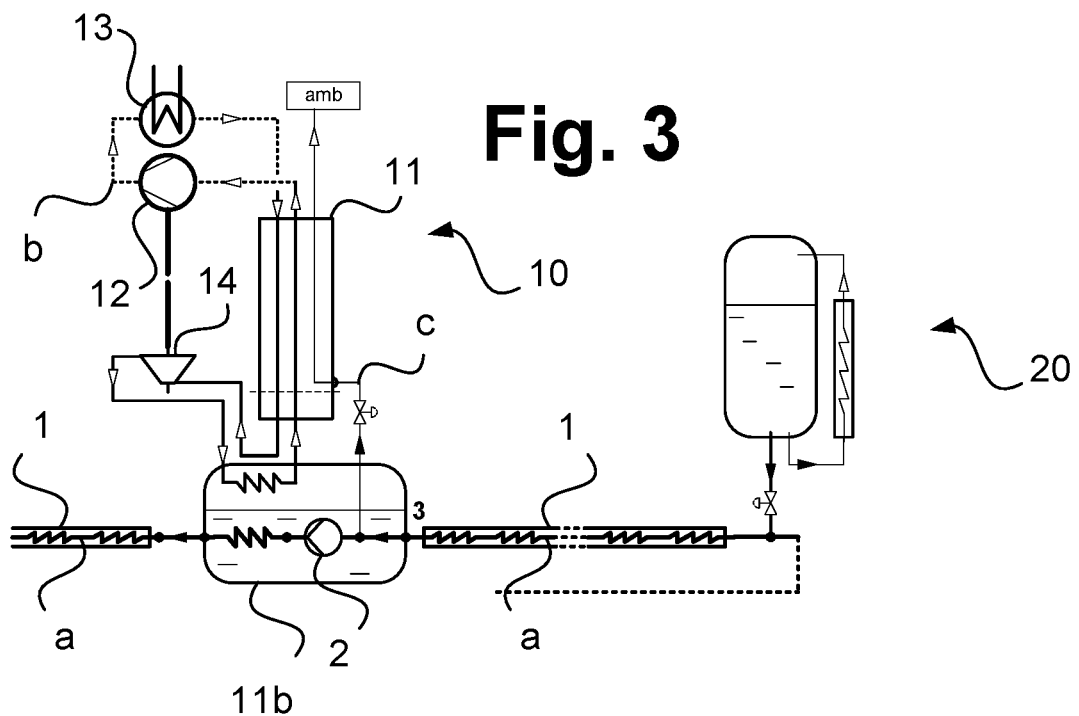
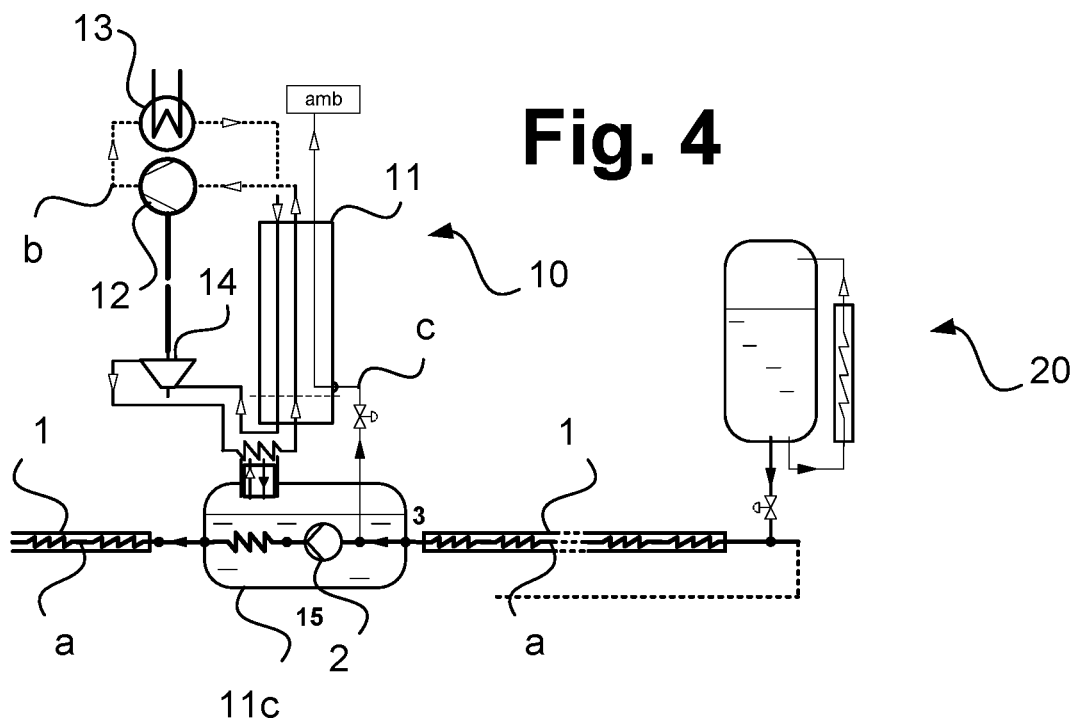

METHOD AND DEVICE FOR COOLING OF A SUPERCONDUCTING CABLE AND CORRESPONDING SYSTEM

CROSS-REFERENCE TO RELATED APPLICATIONS

This application claims priority pursuant to 35 U.S.C. 119(a) to European Patent Application No. 20020335.4, filed Jul. 23, 2020, which application is incorporated herein by reference in its entirety.

FIELD OF THE INVENTION

The present invention relates to a method and a device for cooling of a superconducting cable and a corresponding system according to the preambles of the independent claims.

BACKGROUND

High- and medium-voltage cables, busbars and the like can be designed based on high-temperature superconductors (HTSC) to reduce electrical resistance and therefore the loss of power. High-temperature superconductors can be designed to be operated with direct or alternating current and typically require cooling to a temperature of less than 100 K, preferably less than 80 K.

Different processes and devices can be used to cool superconducting cables. Particularly liquid nitrogen can be used as the cooling medium in such applications, as disclosed in DE 10 2012 016 292 A1, DE 10 2013 011 212 A1 and EP 1 355 114 A3 and others. DE 197 55 484 A1 discloses a process in which a mixture of nitrogen and oxygen is used instead of nitrogen.

The object of the present invention is to provide technical means for the cooling of superconducting cables of the type mentioned which are particularly improved in terms of mechanical design and power.

DISCLOSURE OF THE INVENTION

Against this background, the present invention proposes a method and a device for cooling a superconducting cable, in particular a HTSC cable, as well as a system with a corresponding cooling device and a superconducting cable with the features of the independent claims. Preferred embodiments of the present invention are the subject of the dependent claims as well as the following description.

Typically, liquid nitrogen used for cooling in the applications mentioned at the outset is conveyed by means of a pump, typically also referred to as a circulation pump. If "a" pump is mentioned here, this is not intended to be limiting the number of pumps to exactly one. For example, redundant pumps arranged in parallel or serial pumps or pumping stages may be used in the context of the invention. If, hereinbelow, reference is made to "liquid nitrogen", this shall also include cryogenic liquids which mainly comprise or consist of nitrogen but also comprise other components, such as oxygen, argon or other noble gases. Such mixtures may e.g. comprise more than 90%, preferably more than 95% or 99%, by volume of nitrogen.

The liquid nitrogen is subcooled to the required cooling temperature in a subcooling arrangement downstream of the circulation pump(s). After a thermal contact with the superconducting cable to be cooled, by which the liquid nitrogen is heated, the liquid nitrogen is returned to the circulation pump, thus forming a liquid nitrogen cycle. For providing the liquid nitrogen to the circulation pump, either a dedicated separate return line or a return line integrated into a main line used for cooling of the superconducting cable can be used. Also ring arrangements can be used in which no return line is necessary as here the superconducting cable is e.g. arranged in a way that an inlet for the liquid nitrogen is arranged in proximity of the corresponding outlet, thus allowing the circulation pump and the subcooling apparatus to be arranged therebetween.

The pressure in the liquid nitrogen cycle formed and the temperature to which the liquid nitrogen is subcooled are selected such that no vapor bubbles may form. Typically, the pressure downstream of the circulation pump is selected to be in the range of 5 to 20 bar and the subcooling temperature is selected to be well above ca. 63 K, as at lower temperatures the liquid nitrogen could solidify.

For subcooling of the liquid nitrogen in the liquid nitrogen cycle, subcooling arrangements including a counterflow heat exchanger can be used in which the heat of the liquid nitrogen to be subcooled is transferred to a refrigerant provided by a refrigeration process or system. The counterflow heat exchanger may be designed as a separate heat exchanger or it can be integrated into the heat exchanger (the main heat exchanger) of the refrigeration process.

A further method for subcooling of the liquid nitrogen in the liquid nitrogen cycle is based on a liquid bath through which the liquid nitrogen in the liquid nitrogen cycle is passed in a tube coil or other device providing similar functionality. The recirculation pump can be placed in the liquid bath or outside. The pressure in the vessel containing the liquid bath is adjusted such that the liquid of the liquid bath boils at a temperature sufficiently low to subcool the liquid nitrogen in the liquid nitrogen cycle. For the liquid bath, generally any cryogenic liquid can be used, including, but not limited to argon, nitrogen, oxygen or mixtures of these substances. Nitrogen is typically used since it is used in the liquid nitrogen cycle anyway and therefore is readily available in the system.

The gas evaporating from the liquid bath may either be withdrawn from the system using a vacuum pump, thus maintaining a subatmospheric pressure in the vessel containing the liquid bath, in which case a makeup for the liquid bath must be provided, or it may be recondensed by means of a refrigeration process or system provided as generally described for the counterflow heat exchanger before. In the latter case, the refrigerant may be passed through a headspace of the vessel containing the liquid bath in a suitable coil tube or other device with the same functionality, or the gas evaporating from the liquid bath may be withdrawn from the vessel, provided to a suitable heat exchanger, condensed there and the condensate passed back to the vessel. Also a combination of both these methods including a partial withdrawing and a partial recondensation of the evaporated gas may be used, either in a single device or in two different devices particularly arranged at different places along of the cable being cooled. The cold of the gas withdrawn may also be integrated into, i.e. used in, the refrigeration process if this gas is provided through the main heat exchanger of a refrigeration process or system.

The requirements on cooling systems for HTSC cables and comparable superconducting devices are known: a cooling capacity of 10 to 100 kW at a cooling temperature below 77 K. The cooling system must be low-maintenance and extremely reliable. Low costs as well as low operating costs (high efficiency) are also required. Low space requirements are also an important factor.

Until recently, mostly the so-called Stirling cryocoolers with helium as working gas were available for this temperature and cooling capacity range. The largest cryocoolers of this type can provide about 3 kW cooling capacity at 70 K. These are typically four-cylinder machines (i.e. basically four small coolers are arranged in parallel). The main advantages of Stirling cryocoolers or cryocoolers in general are that a comparatively low technical effort is required to achieve lower temperatures in the low power range. The efficiency and scalability towards larger capacities are however, due to the oscillating regenerative principle of action, fairly limited. For the required cooling capacity, one is forced to use whole batteries of Stirling cryocoolers. The maintenance effort is therefore extremely high. With four machines (sixteen cylinders) at least one unit is usually in maintenance mode and is not available for operation. Stirling cryocoolers therefore require high procurement and operating costs. Since some decades, no activities for the further development of the Stirling refrigeration machine have been recorded.

These disadvantages are overcome in the context of the present invention by using a Brayton cryocooler as known per se for use in the field of the invention. For example, reference may be made to H.-M. Chang et al., "Thermodynamic design of 10 kW Brayton cryocooler for HTS cable", AIP Conference Proceedings 1434, 1664 (2012).

A reversed Brayton process classically consists of five main elements: (1) a compressor, (2) a main heat exchanger, (3) an expander, (4) a cold gas heat exchanger and (5) a thermal insulation for the cold part of the process. In the process, the refrigerant is compressed from a low pressure level to a high pressure level and cooled to a temperature close to the ambient temperature by means of cooling air or cooling water. The refrigerant is thereafter cooled in the main heat exchanger and expanded in an expander from the high pressure level to the low pressure level and therefore cooled to a low temperature. The expanded cold gas is brought into thermal contact with the liquid nitrogen in the liquid nitrogen cycle by means of the cold gas heat exchanger according to the present invention, and the cold gas heated in the cold gas heat exchanger is passed through the main heat exchanger back to the compressor.

A single stage, double stage or multistage compressor may be used for compression. The compression process in the single stage compressor is considered as a near isentropic process. The compression process in the multistage compressor is considered as a near isothermic process since intermediate coolers and an aftercooler are typically used for cooling of compressed fluid between/after the compression stages. As said a separate cold gas heat exchanger may be used for the heat transfer from the liquid nitrogen to the refrigerant, or this heat exchanger may be integrated into the main heat exchanger. That is, the term "main heat exchanger" as used herein may comprise heat exchanging means adapted to cool the refrigerant used in the Brayton process and also heat exchanging means to subcool the nitrogen warming the refrigerant.

The expansion process itself is a near isentropic process if it is realized by means of a single stage expander. Sometimes the expansion process is realized as the so-called double stage expansion. In this case the process sequence includes four steps: (1) a first expansion in a first expander stage from high pressure level to an intermediate pressure level, (2) a transfer of heat from the cold gas to the fluid/object being cooled by means of a first cold gas heat exchanger, (3) a second expansion in the second expander stage from the intermediate pressure level to the low pressure level, (4) a transfer of the cold from the cold gas to the fluid/object being cooled by means of a second cold gas heat exchanger. The expansion in every expander stage itself is a near-isentropic process. But the process chain consisting of two expander stages and two cold gas heat exchangers is not isentropic. Sometimes it is considered as an isothermic process, but from thermodynamic perspective it is not an isothermic process since the cold generated in this process chain is available not at a constant temperature level but in a temperature range. Both the cold gas heat exchangers used in the process with double expansion can be designed as separate single heat exchangers, or they can be combined to a single cold gas heat exchange process unit. Both these heat exchangers can be integrated into the main heat exchanger.

The machines used for compression and expansion of the refrigerant in the Brayton process may be mechanically coupled, i.e. power produced during the expansion is applied for driving the compressor stages, fully or partially, or not. For compression, any suitable machine or arrangement may be used, including, but not limited to, piston, rolling piston, scroll, screw or centrifugal compressors in single stage, two-stage or multistage configuration including or not including intermediate coolers. These may be operated with magnetic bearings, oil-bearings, gas bearings or foil bearings and may be driven by all types of electric motors (with permanent magnet or conventional) or other drives. Likewise, all types of expander devices in the form or turboexpanders with magnetic bearings, oil-bearings, gas bearings or foil bearings may be used. As refrigerants, helium, neon or mixtures based on helium and neon may be used, optionally including a small amount of nitrogen and/or oxygen.

However, the Brayton processes has several disadvantages. Particularly, a large main heat exchanger is required to achieve a reasonable efficiency. This results not only in additional costs but also in a large space requirement. The thermodynamic background for this requirement is that the Brayton process is usually realized on a basis of a single- or two-stage compressor targeting low cost for machinery, and therefore the maximum pressure ratio (high pressure to low pressure) achieved is less than four. This low pressure ratio leads to (a) a low specific cooling capacity of the process, requiring a high refrigerant flow rate; and (b) a low temperature difference in the main heat exchanger. In order to transfer the larger heat duty (because of the large flow rate) at the smaller temperature difference, a very large main heat exchanger is needed. A deliberate reduction of main the heat exchanger leads to a dramatic reduction of the efficiency of the cryocooler.

The solution to this problem provided according to the present invention includes that a small stream of the liquid nitrogen is withdrawn from the liquid nitrogen cycle and provided through the main heat exchanger from the cold end to the warm end, is heated there and is used for cooling of the refrigerant of the warm side of the Brayton process, i.e. in the "main heat exchanger" of the Brayton process.

The method for cooling a superconducting cable, particularly an HTSC cable, which is provided according to the present invention, includes using a coolant containing or consisting of liquid nitrogen. Particularly, the coolant may include at least 70%, 80% or 90% or liquid nitrogen and optionally further components such as oxygen or noble gases from air. At least a part of the coolant is subjected to a subcooling step and thereafter brought into thermal contact with the superconducting cable in a cooling cycle which may generally be provided as indicated above. Said subcooling step is, according to the present invention, at least in part performed using a refrigerant provided by a (reversed)

Brayton process in which at least a part of the refrigerant is cooled and heated in a heat exchanger, also referred to as "main" heat exchanger. According to the present invention, as already briefly mentioned, a part of the coolant is withdrawn from the cooling cycle and heated in the main heat exchanger in which at least a part of the refrigerant is cooled and heated in the Brayton process. This part of the coolant is preferably evaporated in the main heat exchanger and is expanded, in order to generate cold which can be used to operate the main heat exchanger.

Due to the additional cold stream provided according to the present invention, the temperature difference in the main heat exchanger is increased and the main heat exchanger can be made much more compact. The flowrate of refrigerant in the Brayton process is not affected by this, so that the cooling capacity is just as high as with a larger main heat exchanger. For example, a main heat exchanger volume of previously about 12 m$^3$ can be reduced to about 4 m$^3$ by passing 10 g/s liquid nitrogen through the main heat exchanger. At the same cooling capacity of 10 kW, the temperature difference in the main heat exchanger (at the warm end) is thus increased from less than 1 to about 4 K.

According to the present invention, the coolant in the cooling cycle is preferably passed through one or more circulation pumps, thereafter subjected to said subcooling, thereafter brought into said thermal contact with the superconducting cable and thereafter recirculated to the circulation pump. As mentioned in relation to the prior art, recirculating the coolant in the cooling cycle, or a part thereof, to the circulation pump(s) may include using dedicated lines or lines integrated into a main cooling line. It may also be performed in circular arrangements, without specific lines.

Said part of the coolant which is withdrawn from the cooling cycle and heated in the main heat exchanger may be withdrawn from the cooling cycle downstream of said thermal contact with the superconducting cable and before being recirculated to the circulation pump, downstream of the circulation pump and before being subjected to said subcooling, or after a part of said thermal contact with the superconducting cable. In the latter case, the part of the coolant which is withdrawn from the cooling cycle and heated in the main heat exchanger may be passed through a part of a total cooling length only or may be withdrawn between different superconducting cable sections.

One or more compressors or compression stages mechanically coupled to one or more expanders or expansion stages may be used to compress and to expand at least a part of the refrigerant in the Brayton process, according to the present invention. This allows for recovering at least a part of the mechanical energy generated by the expansion.

In a particularly preferred embodiment of the present invention, a compander comprising one or more compression stages and comprising one or more expansion stages may be used in the Brayton process. A compander of the type used may particularly comprise the one or more compression stages the one or more expansion stages on a shaft and an electric motor driving the shaft arranged therebetween. As to bearings usable in such a compander, reference is made to the explanations above.

The one or more compression stages of the compander may, according to the present invention, be used for compressing at least a part of the refrigerant in the Brayton process. The refrigerant thus compressed is preferably withdrawn from the main heat exchanger at the warm end. Aftercooling may be performed after this compression.

The one or more expansion stages of the compander, on the other hand, may either be used for expanding at least a part of the refrigerant in the Brayton process or said part of the coolant which is withdrawn from the cooling cycle and heated in the main heat exchanger, or a part thereof. If the one or more expansion stages of the compander is or are used for expanding at least a part of the refrigerant in the Brayton process, this refrigerant may be withdrawn from the main heat exchanger at an intermediate temperature and it may be reintroduced into the main heat exchanger at the cold end, particularly for cooling in a section where the coolant is subcooled.

If the one or more expansion stages of the compander is or are used for expanding said part of the coolant which is withdrawn from the cooling cycle and heated in the main heat exchanger, or a part thereof, this coolant may either be taken from the warm end of the main heat exchanger, particularly after having been partly expanded before being fed into the main heat exchanger at an intermediate temperature, or it may be heated in the main heat exchanger to an intermediate temperature after which is withdrawn therefrom, expanded in the expansion stage(s), and heated in the main heat exchanger. Generally, the coolant expanded in the expansion stage(s) is heated in the main heat exchanger to provide further cooling power.

One or more further expanders or expansion stages may be used to expand at least a part of the refrigerant in the Brayton process, particularly in a situation where the expansion stage(s) of a compander are used for expanding said part of the coolant which is withdrawn from the cooling cycle and heated in the main heat exchanger. It may alternatively used to expand said part of the coolant which is withdrawn from the cooling cycle and heated in the main heat exchanger or a part thereof, particularly when the expansion stage(s) of a compander are used for expanding at least a part of the refrigerant in the Brayton process. That is, the one or more further expanders or expansion stages may be used to expand the fluid not expanded using the compander.

If the one or more further expanders or expansion stages is or are used at least a part of the refrigerant in the Brayton process, this may subsequently be introduced into the main heat exchanger at the cold end. If the one or more further expanders or expansion stages is or are used at least a part of said part of the coolant which is withdrawn from the cooling cycle and heated in the main heat exchanger or a part thereof, this may be reintroduced in the main heat exchanger after expansion and further be warmed. The further expander(s) may be braked using an electric generator, an oil brake, a gas brake or the like. The further expander(s) may comprise a gas bearing.

According to an embodiment of the invention, a single-shaft compressor comprising two compression stages may be used for compressing at least a part of the refrigerant in the Brayton process. In such an arrangement, the single-shaft compressor may be provided with intermediate cooling or only aftercooling arrangements. The motor may e.g. a permanent magnet synchronous motor or any motor. Any bearing type mentioned before can be used.

Processing at least a part of the refrigerant in the Brayton process using such a two-stage compressor may include withdrawing the refrigerant from the main heat exchanger at the warm end, a first compression step in the single-shaft compressor, intermediate cooling or aftercooling, cooling in the main heat exchanger to an intermediate temperature level, a second compression step in the single-shaft compressor, and further cooling in the main heat exchanger. The refrigerant thus cooled may be expanded using an expander including a brake.

In alternative, processing at least a part of the refrigerant in the Brayton process using a two-stage compressor may include withdrawing the refrigerant from the main heat exchanger at the warm end, a first compression step in the single-shaft compressor, intermediate cooling a second compression step in the single-shaft compressor without cooling in the main heat exchanger therebetween, and subsequently thereto cooling in the main heat exchanger. The refrigerant thus cooled may be expanded using an expander including a brake.

In all embodiments of the present invention, subcooling of the coolant comprising or consisting of nitrogen may be performed in a section of the main heat exchanger which is particularly supplied with the expanded refrigerant of the Brayton process.

A device for cooling a superconducting cable using a coolant containing or consisting of liquid nitrogen, wherein the device is adapted to subject least a part of the coolant to a subcooling step and thereafter bring it into a thermal contact with the superconducting cable in a cooling cycle, wherein for performing said subcooling at least in part a refrigerant is provided in a Brayton process in which at least a part of the refrigerant is cooled and heated in a main heat exchanger is also part of the present invention. This device is characterized in that means are provided to withdraw at least a part of the coolant from the cooling cycle and to heat it in the main heat exchanger in which at least a part of the refrigerant is cooled and heated in the Brayton process.

For the further features and advantages of the device according to the invention and its advantageous embodiments, explicit reference is made to the above explanations concerning the method according to the invention and its embodiments. Preferably, a corresponding device or an embodiment thereof is adapted to perform a corresponding process or a variant thereof. This also applies to the system provided for in the invention, which comprises such a device and a corresponding superconducting cable.

The invention is explained in more detail below with reference to the attached drawings, in which embodiments of the invention are illustrated.

BRIEF DESCRIPTION OF THE DRAWINGS

FIGS. 1 to 15 illustrate devices systems, arrangements and methods according to preferred embodiments of the invention in full and partial illustration.

Figure 1:
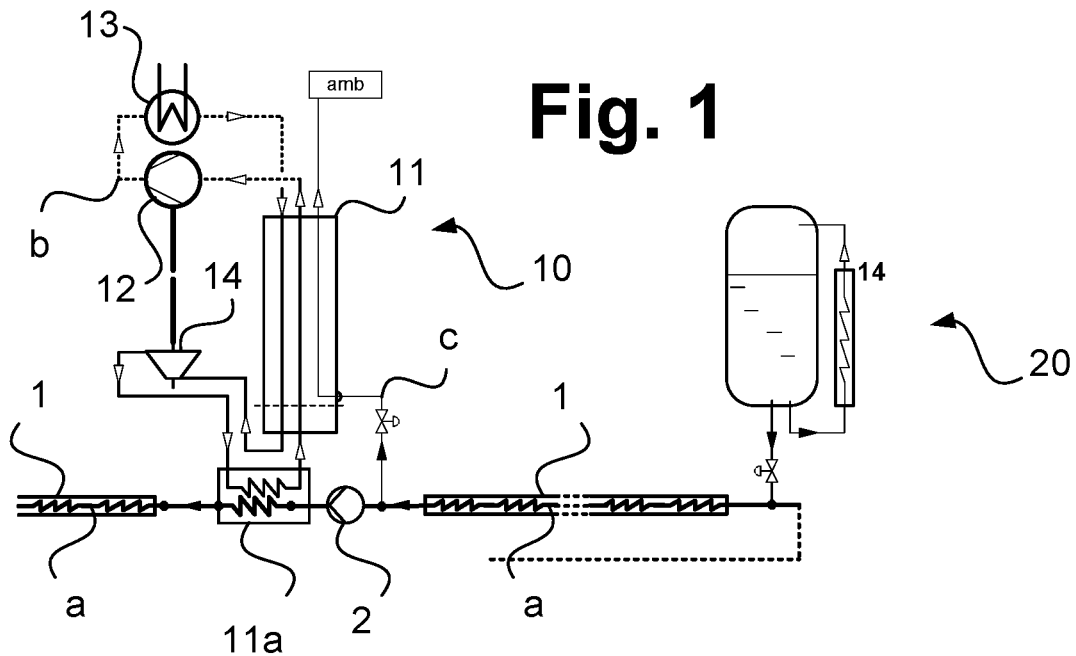
Figure 2:
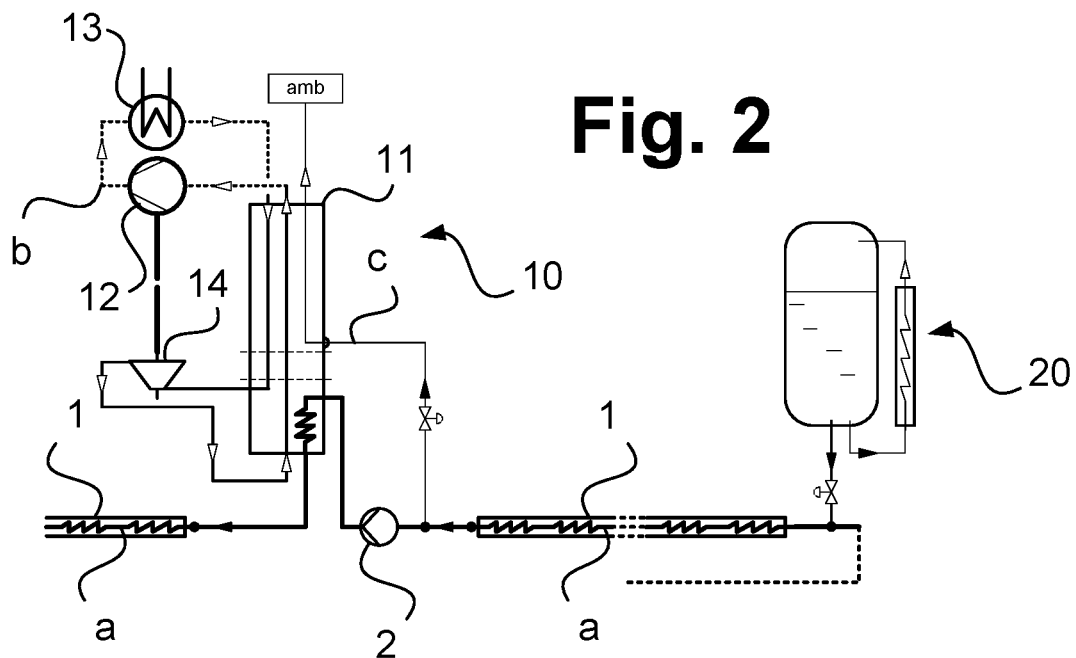
Figure 5:
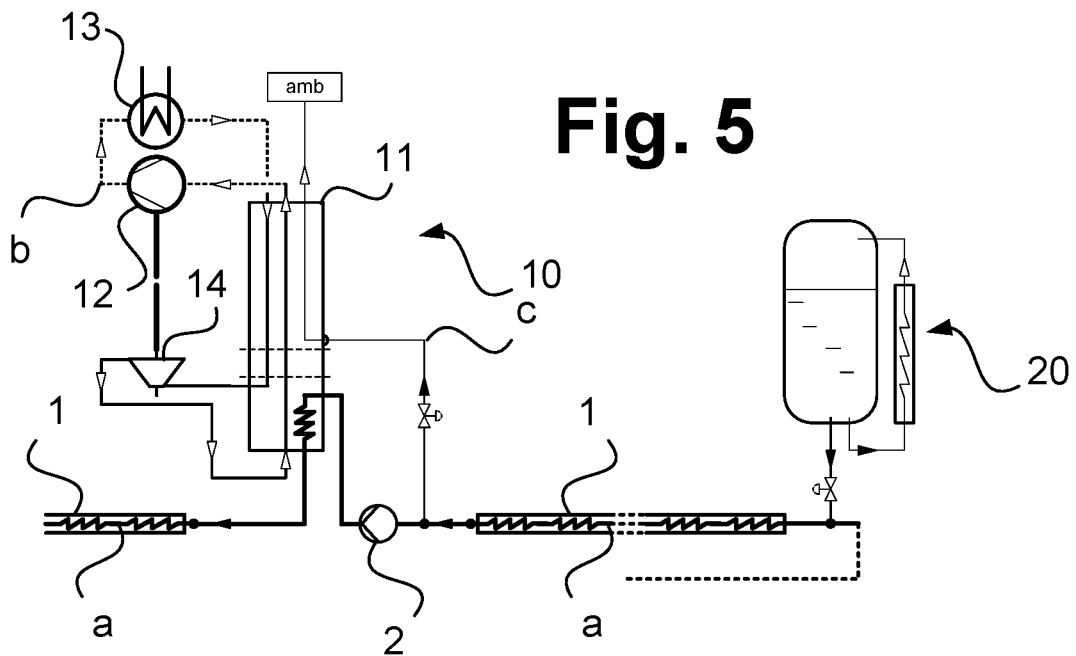
Figure 6:
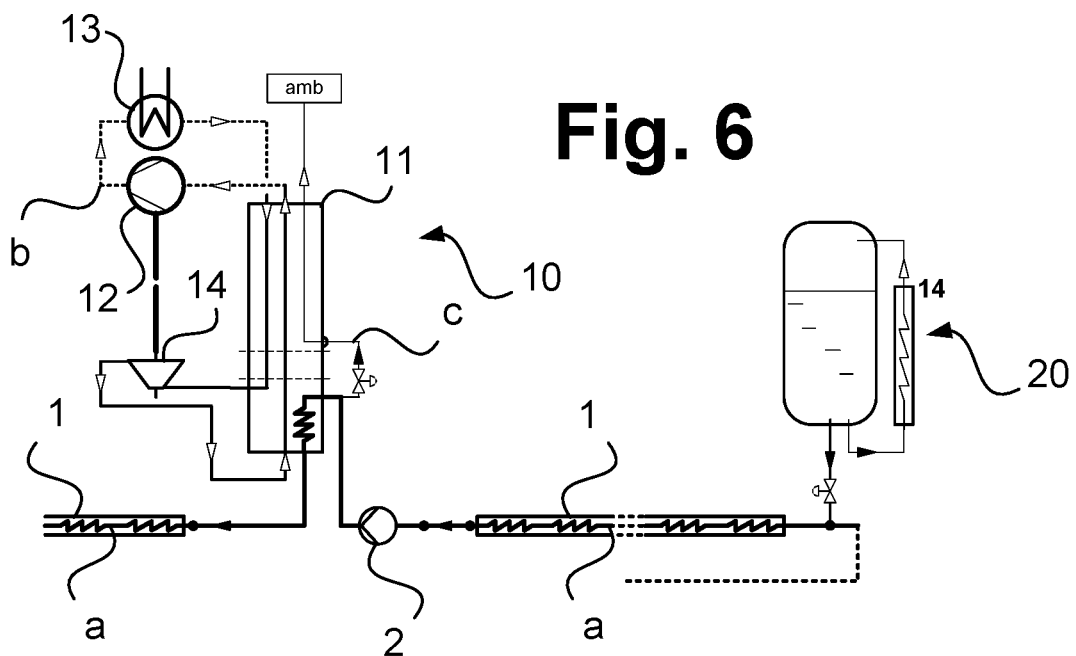

In the Figures, identical or functionally corresponding elements are indicated with identical reference numerals. For the sake of clarity, no repeated explanation of such elements is given. Liquid media are illustrated by black (filled) flow arrows, gaseous media by white (unfilled) flow arrows. Explanations relating to methods provided according to the present invention and embodiments thereof equally apply to corresponding apparatus and vice versa.

DETAILED DESCRIPTION OF THE DRAWINGS

In all the Figures, a superconducting cable which is particular a power line, preferably a HTSC power line, is indicated with 1. In the Figures, two sections of the superconducting cable 1 are shown, but the invention may equally be used with a superconducting cable 1 comprising only one or more than two sections. A stream of a coolant provided in a coolant cycle and brought into thermal contact with the superconducting cable 1 is indicated with a. The coolant in the coolant cycle is passed through a circulating pump 2, raising its pressure from an inlet pressure above 2 bar by typically more than 2 bar.

The coolant of stream a is, in any cases, subjected to a subcooling step after being passed through the pump 2 and thereafter brought into thermal contact with the superconducting cable 1 in different ways.

In the embodiments shown in FIGS. 1, 3, 4 and 9 (the latter being a partial illustration of a reverse Brayton process), a dedicated cooling arrangement 11a, 11b and 11c separate from a main heat exchanger 11 of a cryocooler 10 in which a Brayton process is established (see below) is used for this purpose, wherein the cooling arrangement 11a according to FIG. 1 comprises or consists of a counter-stream heat exchanger and in the cooling arrangements 11b and 11c according to FIGS. 3 and 4, a bath cooler is provided. As explained at the outset, in the such bath coolers a gas evaporating from a liquid bath operated at a reduced pressure, e.g. at about 0.15 to 0.5 bar, is recondensed. To this purpose, according to FIG. 3, i.e. in the cooling arrangement 11b, a coolant from a cryocooler 10 is passed through a headspace above the liquid bath while according to FIG. 4, i.e. in the cooling arrangement 11c, the gas is first passed outside of a vessel containing a liquid bath and a condensate is reintroduced into the vessel thereafter. In the cooling arrangements 11b and 11c according to FIGS. 3 and 4, also the circulation pump 2 is arranged in the liquid bath.

In the other embodiments shown, a section of a main heat exchanger 11 of a cryocooler 10 including a Brayton process (see below) is used for subcooling, through which the coolant of stream a is passed and subcooled. Be it known that all embodiments can be used with any of the cooling options shown and the present invention shall not be understood to be limited to a specific combination.

In all cases, the subcooling step is at least in part performed using a refrigerant provided in a Brayton process established in a cryocooler 10, and the embodiments of the present invention mainly differ by the operation of this cryocooler 10. In all embodiments, the cryocooler comprises a ("main") heat exchanger 10. To replenish the coolant of stream a, a coolant storage system 20 using evaporative pressure build-up is provided in all embodiments of the invention shown.

Figure 7:
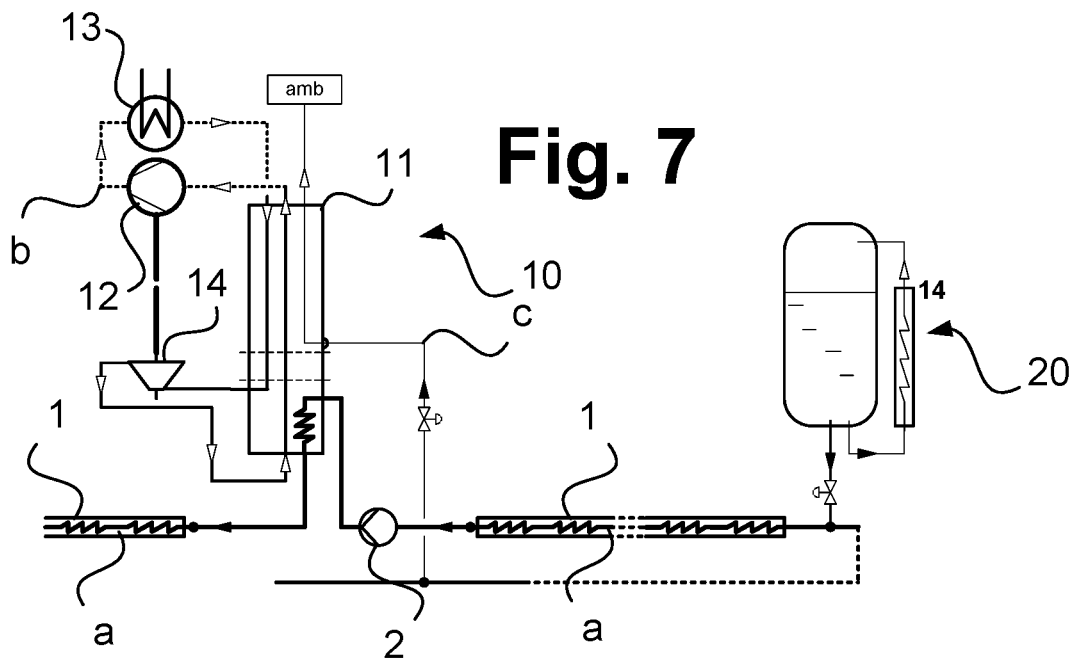
Figure 8:
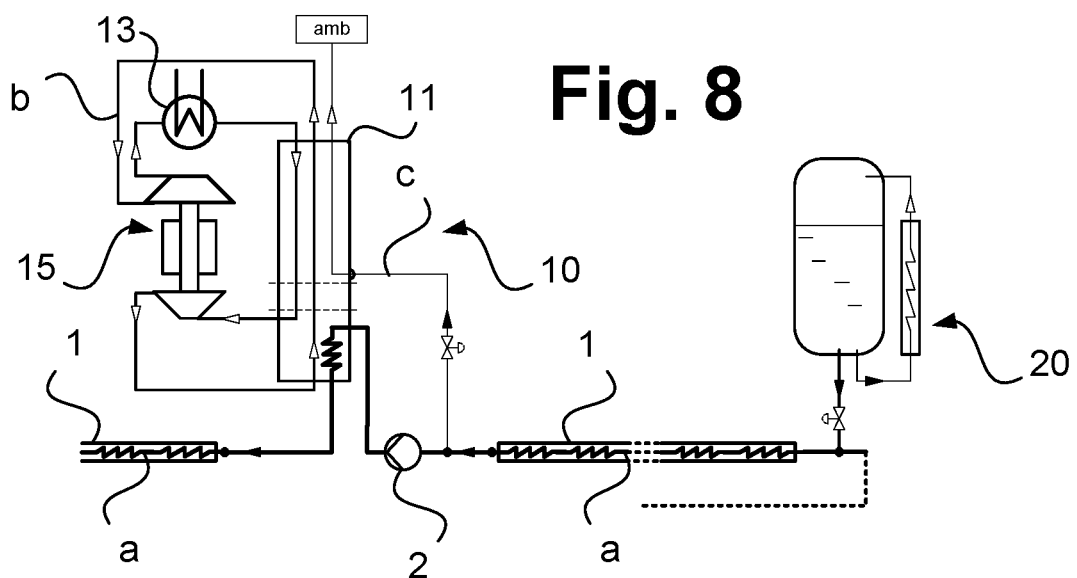
Figure 9:
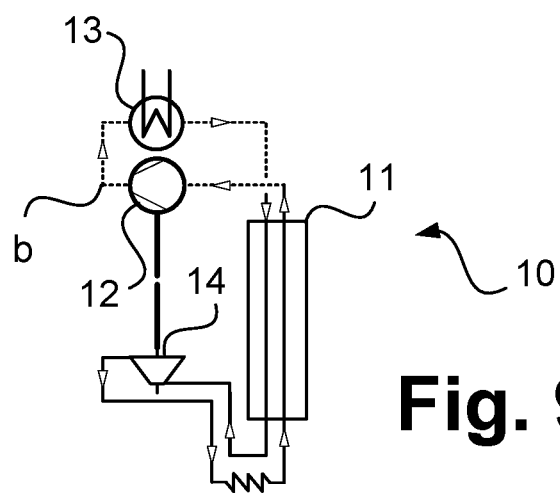
Figure 10:
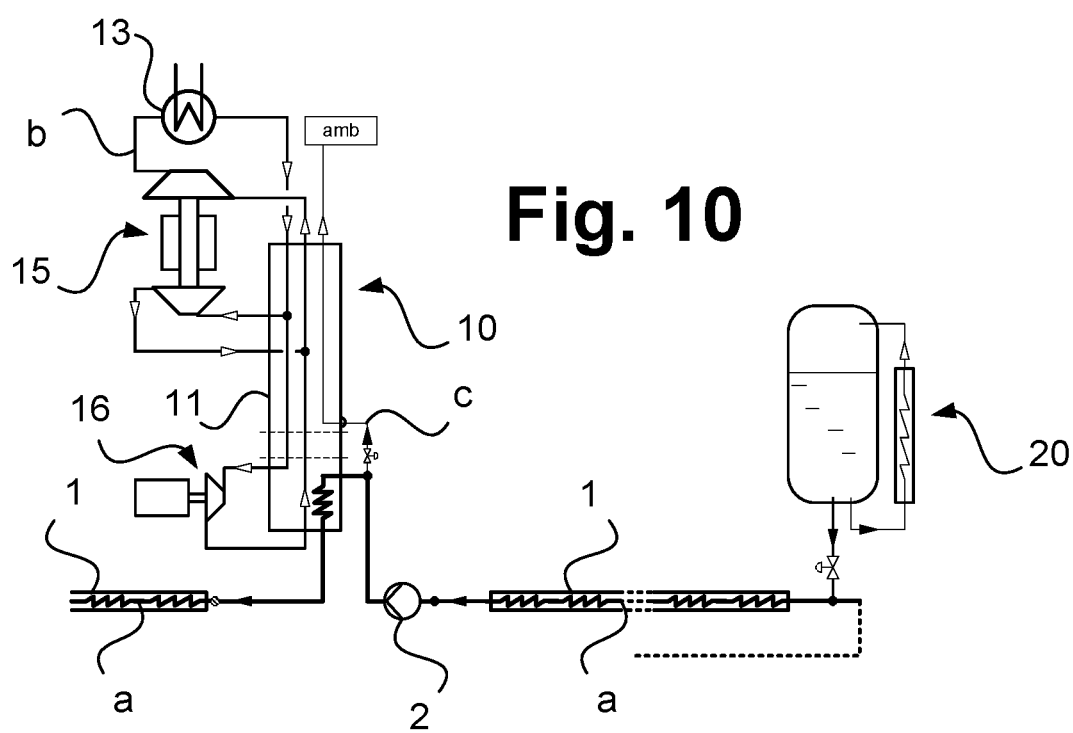
Figure 11:
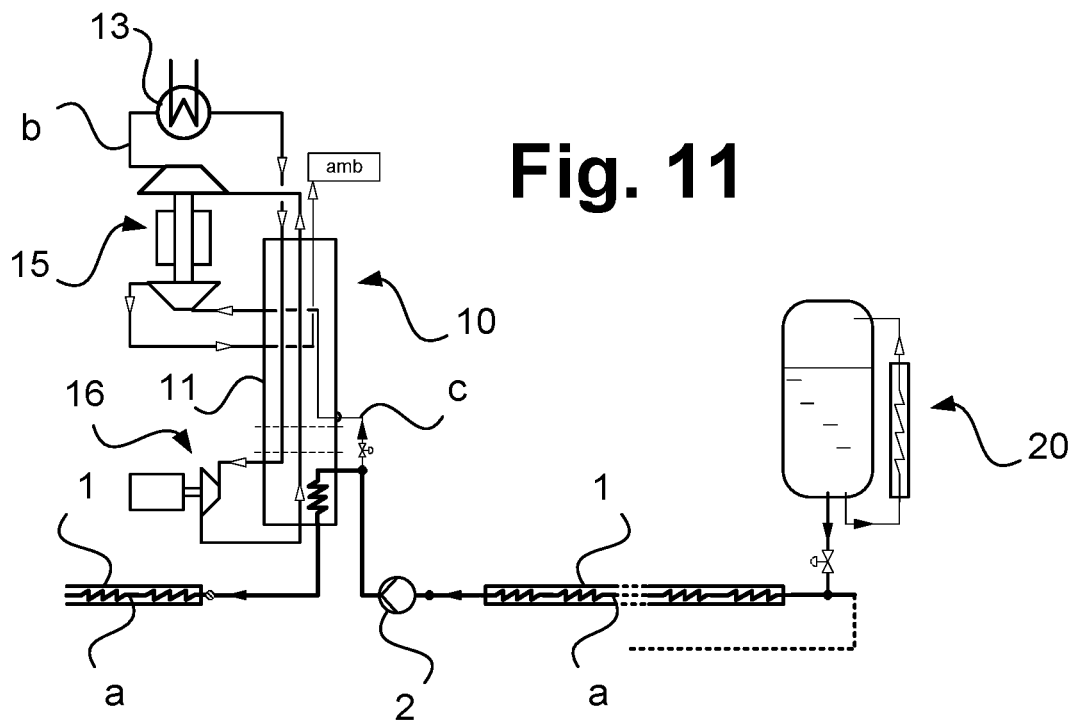
Figure 12:
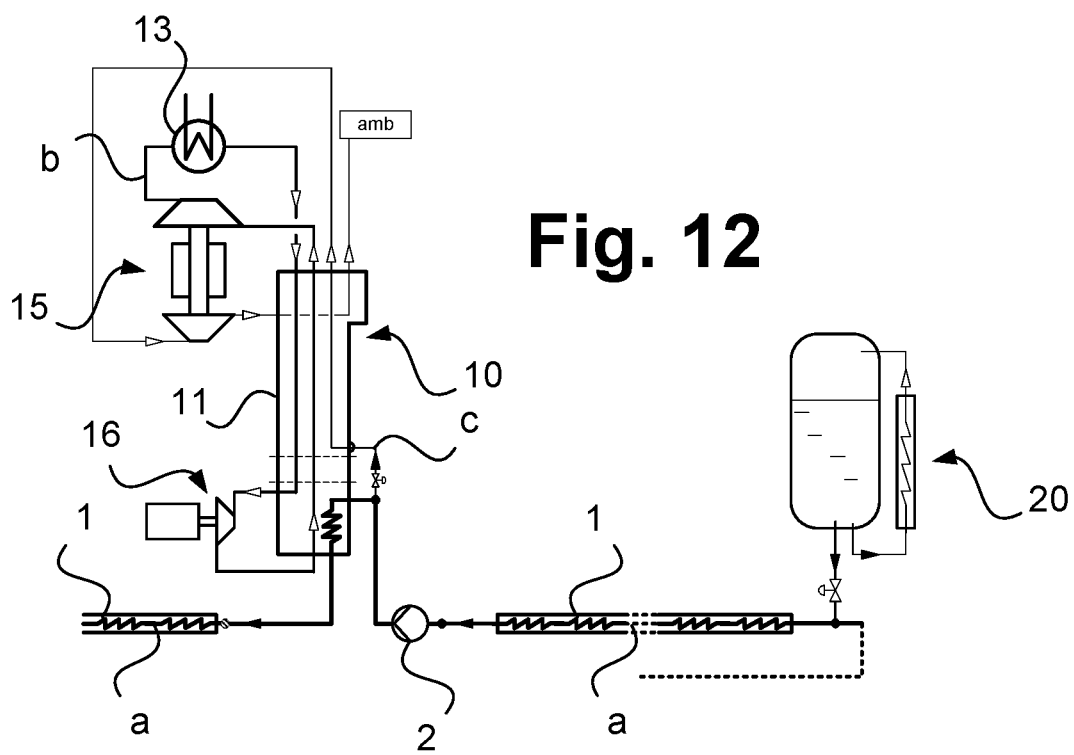
Figure 13:
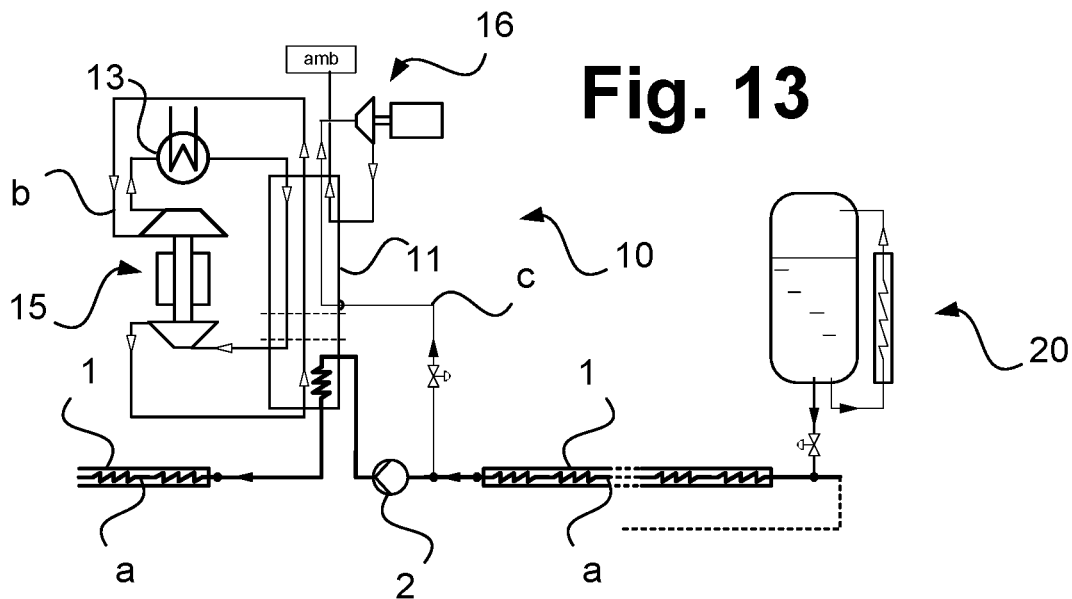

In all embodiments shown, a partial stream c, i.e. a part of the coolant withdrawn from the cooling cycle, is heated in the main heat exchanger 11. Stream c is expanded, according to the embodiments shown in FIGS. 1 to 8, 10, 14 and 15, to a pressure slightly above atmospheric pressure using an expansion valve (not indicated) and is thereafter heated in the main heat exchanger 11 before being vented to the atmosphere amb. As immediately evident from the illustrations of the different embodiments, stream c, i.e. the part of the coolant which is withdrawn from the cooling cycle, i.e. of stream a, and heated in the heat main exchanger 11 may be withdrawn from the cooling cycle downstream of a thermal contact with the superconducting cable 1 and before being recirculated to the circulation pump 2 (see FIGS. 1 to 5, 8 and 13), downstream of the circulation pump 2 and before being subjected to subcooling (FIGS. 6, 10 to 12, 14 and 15) or after a part of said thermal contact with the superconducting cable 1 (FIG. 7).

In the embodiments shown in FIGS. 1 to 7, the cryocooler 10 comprises a compressor 12 (or several compressors or compression stages), an aftercooler 13 (or several aftercoolers) and an expander 14 (or several expanders or expansion stages). The compressor 12 (or the several compressors or compression stages) and the expander 14 (or the several expanders or expansion stages) may or may not be mechanically coupled. A refrigerant of a refrigerant stream b, e.g. helium or argon or a mixture mentioned before is, in the embodiments shown in FIGS. 1 to 7, withdrawn from the warm end of the heat exchanger 11, compressed in the compressor 12 (or the several compressors or compression stages), aftercooled in the aftercooler 13 (or several aftercoolers), cooled in the heat exchanger 11 to an intermediate temperature level, expanded in the expander 14 (or the several expanders or expansion stages), introduced into the heat exchanger 11 at its cold end and heated therein, thereby subcooling coolant stream a. In the partial illustration of FIG. 9, stream b is instead withdrawn from the heat exchanger 11 at the cold end before being expanded in the expander 14 (or the several expanders or expansion stages).

According to the embodiments shown in FIGS. 8 and 10 to 13, a compander 15 is provided, the compression stage(s) of which being, not specifically indicated, displayed at the top and the expansion stage(s) of which being, not specifically indicated, displayed at the bottom, respectively. In the embodiment shown in FIG. 8, stream b is compressed and expanded using the compander 15 essentially as described before for FIGS. 1 to 7. In the embodiments shown in FIGS. 10 to 13, an additional expander 16 e.g. comprising a brake is provided. In the embodiment shown in FIG. 10, stream b is partially withdrawn from the heat exchanger 11 at an intermediate temperature, expanded in the expansion stage of the compander 15, and reintroduced into the heat exchanger 11 for further heating, while another part is further cooled and expanded in the further expander 16. In the embodiment shown in FIG. 11 the complete stream b is expanded in the further expander 16 while in the expansion stage of the compander 15 instead stream c, which is not fully expanded before and withdrawn from the heat exchanger 11 at its warm end, is expanded before being reintroduced into the heat exchanger 11. In the embodiment shown in FIG. 12, similarly to the embodiment shown in FIG. 11, in the expansion stage of the compander 15 stream c, which is not fully expanded here as well before but withdrawn from the heat exchanger 11 at an intermediate temperature is expanded. In the embodiment shown in FIG. 13, stream b is completely expanded in the expansion stage of the compander 15 and stream c is expanded in the further expander 16.

Figure 14:
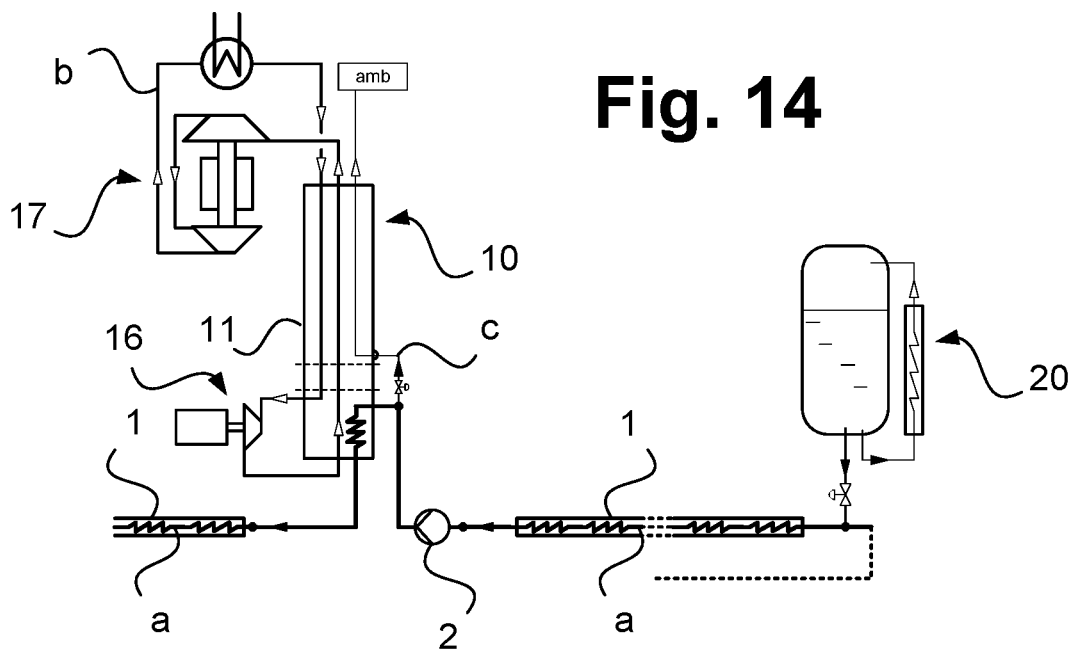
Figure 15:
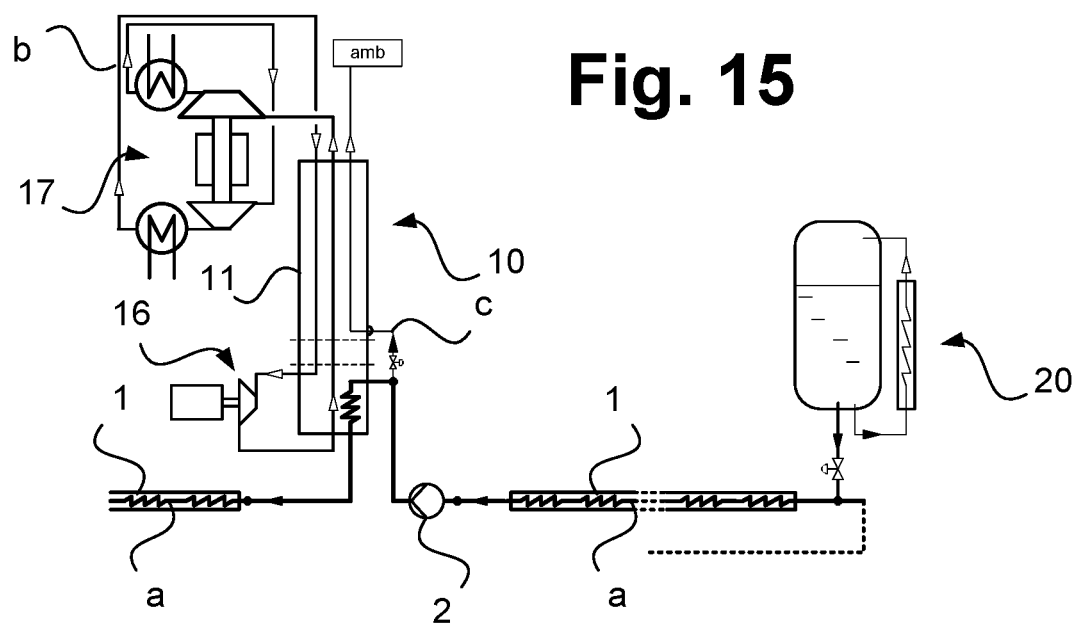

According to the embodiments shown in FIGS. 14 and 15, a two-stage compressor with a common shaft and an electric motor is used for compressing the stream b without intercooling (FIG. 14) and with intercooling (FIG. 15). The further expander 16 is used for expansion of stream b.

The invention claimed is:

1. A method for cooling a superconducting cable (1) using a coolant comprising liquid nitrogen, the method comprising:
subjecting at least a part of the coolant to a subcooling step and thereafter bringing the at least a part of the coolant into thermal contact with the superconducting cable (1) in a cooling cycle,
wherein said subcooling step is at least in part performed using a refrigerant which is provided in a Brayton process in which at least a part of the refrigerant is cooled and heated in a main heat exchanger (11) and a part of the coolant is withdrawn from the cooling cycle and heated in the same main heat exchanger (11) in which at least a part of the refrigerant is cooled and heated in the Brayton process.

2. The method according to claim 1, wherein the coolant in the cooling cycle is passed through one or more circulation pumps (2), thereafter subjected to said subcooling, thereafter brought into said thermal contact with the superconducting cable (1), and thereafter recirculated to the circulation pump (2).

3. The method according to claim 2, wherein said part of the coolant which is withdrawn from the cooling cycle and heated in the main heat exchanger (11) is:
(a) withdrawn from the cooling cycle downstream of said thermal contact with the superconducting cable (1) and before being recirculated to the circulation pump (2),
(b) withdrawn from the cooling cycle downstream of the circulation pump (2) and before being subjected to said subcooling, or
(c) withdrawn from the cooling cycle after a part of said thermal contact with the superconducting cable (1).

4. The method according to claim 1, wherein a compander (15) comprising one or more compression stages and one or more expansion stages is used in the Brayton process.

5. The method according to claim 4, wherein the one or more compression stages of the compander (15) is or are used for compressing at least a part of the refrigerant in the Brayton process, and wherein the one or more expansion stages of the compander (15) is or are used for expanding at least a part of the refrigerant in the Brayton process or said part of the coolant which is withdrawn from the cooling cycle and heated in the main heat exchanger (11) or a part thereof.

6. The method according to claim 4, wherein one or more further expanders (16) or expansion stages is or are used to expand
at least a part of the refrigerant in the Brayton process, or
said part of the coolant which is withdrawn from the cooling cycle and heated in the main heat exchanger (11) or a part thereof.

7. The method according to claim 4, wherein one or more further expanders (16) or expansion stages is or are used to expand at least a part of the refrigerant in the Brayton process.

8. The method according to claim 1, wherein one or more compressors (12) or compression stages is or are used to compress at least a part of the refrigerant in the Brayton process, and one or more expanders (14) or expansion stages is or are used to expand at least a part of the refrigerant in the Brayton process, and wherein the one or more compressors (12) or compression stages are mechanically coupled to the one or more expanders (14) or expansion stages.

9. The method according to claim 1, wherein a single-shaft compressor (17) comprising two compression stages is used for compressing at least a part of the refrigerant in the Brayton process.

10. The method according to claim 1, wherein said subcooling is performed in a section of the main heat exchanger (11).

11. The method according to claim 1, wherein the coolant contains at least 70% liquid.

12. The method according to claim 1, wherein said part of the coolant which is withdrawn from the cooling cycle and heated in the main heat exchanger (11) is withdrawn from the cooling cycle downstream of said thermal contact with the superconducting cable (1) and before being recirculated to the circulation pump (2).

13. The method according to claim 1, wherein said part of the coolant which is withdrawn from the cooling cycle and heated in the main heat exchanger (11) is withdrawn from the cooling cycle downstream of the circulation pump (2) and before being subjected to said subcooling.

14. The method according to claim 1, wherein said part of the coolant which is withdrawn from the cooling cycle and heated in the main heat exchanger (11) is withdrawn from the cooling cycle after a part of said thermal contact with the superconducting cable (1).

15. The method according to claim 1, wherein said subcooling is performed in a counter-stream heat exchanger (11a) separate from the main heat exchanger (11).

16. The method according to claim 1, wherein said subcooling is performed in a bath cooler (11b, 11c) separate from the main heat exchanger (11).

17. A device for cooling a superconducting cable (1) using a coolant comprising liquid nitrogen, wherein the device comprises:
- a subcooling apparatus for subjecting at least a part of the coolant to a subcooling step before bringing the at least a part of the coolant into thermal contact with the superconducting cable (1) in a cooling cycle,
- wherein in the subcooling apparatus includes means for the subcooling, at least in part, a refrigerant in a Brayton process in which at least a part of the refrigerant is cooled and heated in a main heat exchanger (11), and
- means for withdrawing at least a part of the coolant from the cooling cycle and to heating the part of the coolant from the cooling cycle it in the same main heat exchanger (11) in which at least a part of the refrigerant is cooled and heated in the Brayton process.

18. A system comprising a device according to claim 17 and a superconducting cable (1) arranged to be cooled by the device.

19. The system according to claim 18, wherein the superconducting cable is a high-temperature superconducting cable.

20. A method for cooling a superconducting cable (1) using a coolant comprising liquid nitrogen, the method comprising:
- subjecting at least a part of the coolant to a subcooling step and thereafter bringing the at least a part of the coolant into thermal contact with the superconducting cable (1) in a cooling cycle,
- wherein said subcooling step is at least in part performed using a refrigerant which is provided in a Brayton process in which at least a part of the refrigerant is cooled and heated in a main heat exchanger (11) and a part of the coolant is withdrawn from the cooling cycle, expanded using an expansion valve, and heated in the main heat exchanger (11) in which at least a part of the refrigerant is cooled and heated in the Brayton process, before being vented to the atmosphere, and
- wherein the coolant in the cooling cycle is passed through one or more circulation pumps (2), thereafter subjected to said subcooling, thereafter brought into said thermal contact with the superconducting cable (1), and thereafter recirculated to the circulation pump (2), and
- wherein said part of the coolant which is withdrawn from the cooling cycle and heated in the main heat exchanger (11) is:
  (a) withdrawn from the cooling cycle downstream of said thermal contact with the superconducting cable (1) and before being recirculated to the circulation pump (2),
  (b) withdrawn from the cooling cycle downstream of the circulation pump (2) and before being subjected to said subcooling, or
  (c) withdrawn from the cooling cycle after a part of said thermal contact with the superconducting cable (1).

* * * * *